United States Patent
Melkote et al.

(10) Patent No.: US 6,924,960 B1
(45) Date of Patent: Aug. 2, 2005

(54) TIMING COMPENSATION IN A SELF-SERVOWRITING SYSTEM

(75) Inventors: Hemant Melkote, San Jose, CA (US); Robert L. Cloke, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 173 days.

(21) Appl. No.: 10/632,880

(22) Filed: Jul. 31, 2003

(51) Int. Cl.[7] ............................................. G11B 5/596
(52) U.S. Cl. ................................................. 360/77.06
(58) Field of Search ............................ 360/75, 51, 25, 360/26, 77.04, 77.11, 77.06

(56) References Cited

U.S. PATENT DOCUMENTS

| | | | | |
|---|---|---|---|---|
| 5,875,064 A | * | 2/1999 | Chainer et al. | ................ 360/75 |
| 5,901,003 A | * | 5/1999 | Chainer et al. | ................ 360/51 |
| 6,122,124 A | * | 9/2000 | Fasen et al. | .................. 360/51 |
| 6,124,996 A | * | 9/2000 | Fasen et al. | .................. 360/51 |
| 6,172,837 B1 | * | 1/2001 | Fasen | ........................... 360/75 |
| 6,324,027 B1 | * | 11/2001 | Chainer et al. | ............... 360/51 |
| 6,469,859 B1 | * | 10/2002 | Chainer et al. | ............... 360/75 |

* cited by examiner

*Primary Examiner*—David Hudspeth
*Assistant Examiner*—Fred F. Tzeng
(74) *Attorney, Agent, or Firm*—Robroy R. Fawcett, Esq.

(57) ABSTRACT

A method is disclosed for defining tracks on a rotating magnetic disk medium of a disk drive. Reference tracks are followed using a servo control loop while writing servo patterns defining a first target servo track. The servo control loop includes a two-dimensional digital state compensator having a first input that receives timing error signals, a first output that generates control signals for a controlled oscillator, a second output that generates timing state variables, and a second input that receives stored timing state variables. The first target track is followed using the servo control loop while servo patterns are written, and while the stored timing state variables corresponding to the servo patterns defining the first target track are applied to the second input.

22 Claims, 3 Drawing Sheets

TIMING COMPENSATION IN A SELF-SERVOWRITING SYSTEM

BACKGROUND OF THE INVENTION

1. Field of the Invention

The present invention relates to magnetic disk drives, and more particularly, to self-servowriting of tracks on a rotating magnetic disk medium.

2. Description of the Related Art

The writing of servo track information on a magnetic disk medium is a critical process in the manufacture of a disk drive. Conventionally, servo track information is written with a specialized servowriting instrument mounted on a large granite block to minimize external vibration effects. Increasing track densities and decreasing disk size has led to the investigation of self-servowriting techniques.

In self-servowriting, the read head track-follows on a track and writes the servo information for a subsequent track, which then becomes the reference track for the next track. The process is repeated until all servo tracks are written. When a conventional Phase Locked Loop (PLL) compensator is used, errors arise due to amplification of spindle harmonics and other timing disturbances of similar frequency spectrum in the written track due to the peaking nature of the closed-loop transfer function. Thus, there is a need for technique for reducing phase or timing error propagation during self-servowriting.

SUMMARY OF THE INVENTION

The present invention solves these and other problems by providing multi-dimensional compensation for phase (timing) control of a Controlled Oscillator (CO) in a self-servowriting system. In one embodiment, a two-dimensional compensator is used to control timing and/or phase while self-servowriting. The compensator has a two input two output structure. The first input is the timing error and the first output is a control signal for a controlled oscillator. The second input is the second output stored from previous operation of writing the servo track. When a track is written, the data from the second output of the compensator is stored in a lookup table and used as the second input of the compensator when the next track is written. This process is repeated while writing other servo tracks. The compensator parameters are designed to avoid timing error propagation (e.g., amplification of disturbance components in the phase of the written track) during the self-servowriting process.

One embodiment includes a method for writing servo tracks on a rotating magnetic disk medium by following a reference track (or tracks) corresponding to previously-written servo patterns and using a servo control loop while writing servo patterns at a first target track on the magnetic disk medium. In one embodiment, the servo control loop has a closed-loop response and includes a two-dimensional state compensator with an input configured to receive timing error signals, output signals for controlling a controlled oscillator, timing state variables inputs, and timing state variable outputs. Timing state variables corresponding to the first target track are stored for use in writing a subsequent track. In one embodiment, the method also includes following the first target track using the servo control loop while writing servo patterns defining a second target track while providing the first stored timing state variables to the second input of the two-dimensional state compensator.

One embodiment includes a method for writing servo tracks on a rotating magnetic disk medium by writing a reference track comprising servo patterns and track-following the reference track while writing a first self-written servo track under control of a closed-loop timing servo control loop having a compensator with at least first and second inputs and first and second outputs. In one embodiment, the first input is configured to receive timing error signals, and the first output provides control signals for a controlled oscillator. The second output provides first timing state variables corresponding to the first self-written servo track, and the second input is configured to receive timing state variables corresponding to the reference track. In one embodiment, the method also includes storing the first timing state variables, and track-following the first self-written servo track while writing a second self-written servo track and while providing the first stored timing state variables to the second input.

In one embodiment, the control signals for the controlled oscillator include control signals for a voltage-controlled oscillator, a numerically-controlled oscillator, a current-controlled oscillator, a phase-controlled oscillator, a timing generator, etc. In one embodiment, the compensator is an observer-based compensator.

In one embodiment, a system for writing servo tracks on a rotating magnetic disk medium includes a rotating magnetic disk medium having a first servo track, a memory for storing timing state information, and a timing control system module configured to control timing while self-writing a second servo track. The control system module includes a compensator module. The compensator module includes a first input configured to receive timing error signals, first output to provide control signals to a controlled oscillator, a second input configured to receive previously-stored timing state variables corresponding to the first servo track, and second output configured to provide timing state variables corresponding to the second servo track to the memory.

In one embodiment, the read head follows between first and second tracks while the write head is writing servo track information along a third track. In one embodiment, timing state variable information provided to the compensator for writing the third track is a combination of first timing state variable outputs from the compensator produced while writing the first track and second timing state variable outputs from the compensator produced while writing the second track. In one embodiment, first state variable information and second state variable information are combined to produce input state variable information for the compensator. In one embodiment, first state variable information and second state variable information are linearly combined to produce input state variable information for the compensator.

BRIEF DESCRIPTION OF THE DRAWINGS

The accompanying drawings illustrate embodiments of the present invention and, together with the description, serve to explain the principles of the invention.

DETAILED DESCRIPTION OF THE PREFERRED EMBODIMENT

Figure 1:
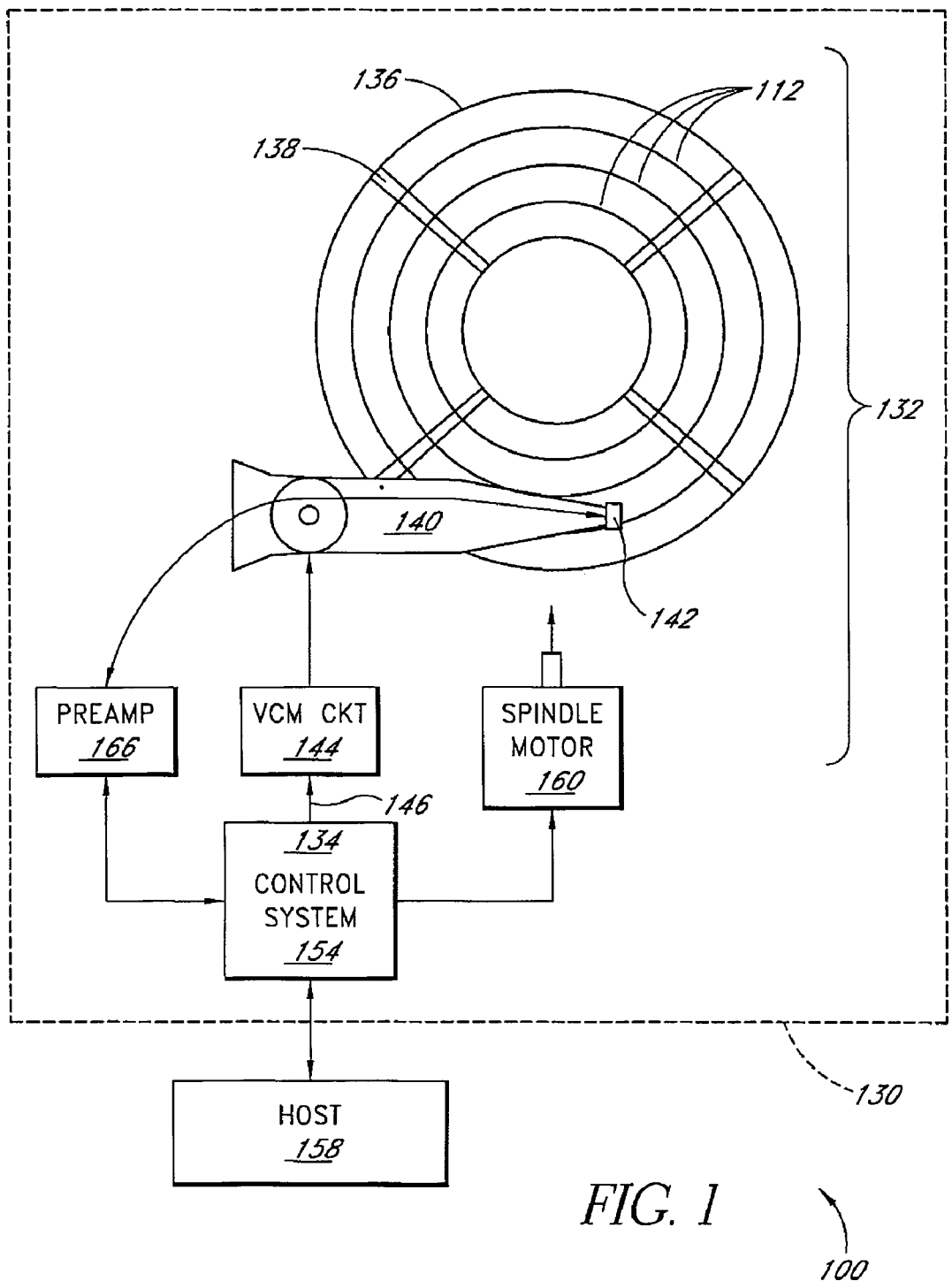
FIG. 1 is a block diagram of a self-servowriting system including a disk drive coupled to a host.

FIG. 1 is a block diagram if a self-servowriting system 100 including a disk drive 130 coupled to a host 158. The disk drive 130 includes a rotating magnetic medium 136. The disk drive 130 has a head disk assembly (HDA) 132 and a servo controller 134. The HDA 132 includes a rotating magnetic disk 136 having, after servo writing, distributed position information in a plurality of servo wedges 138 written on circular servo tracks 112. A rotary actuator 140 pivots relative to a base and that carries a transducer head 142 that periodically reads the position information from the servo wedges, and a voice coil motor (VCM) circuit 144 that includes a voice coil motor coupled to the rotary actuator and that responds to a control effort signal 146. The sampled servo controller 134 periodically adjusts the control effort signal during a track-following operation based on position information. In one embodiment, the transducer head has a read element 148 and an offset write element 150. In one embodiment, the write element is wider than the read element.

Servo patterns on the servo track 112 can include servo burst patterns, spiral servo patterns, repetitive patterns whose amplitude varies with position, and/or repetitive patterns whose phase varies with position. An ideal servo track 112 is one that forms a circle on the disk 136, with the servo information written at selected locations around the track. In one embodiment, the servo information is written in servo wedges 138 spaced around the servo tracks 112. During manufacture, servo information for the embedded servo wedges 138 is placed on the disk during the self-servowriting operation.

The disk drive 130 further includes a control system 154, and the HDA 132 further includes a spindle motor 160 and a preamplifier 166. The control system includes the sampled servo controller 134, and circuitry and processors that control the HDA 132 and that provide an intelligent interface between a host 158 and the HDA 132 for execution of read and write commands.

Figure 2:
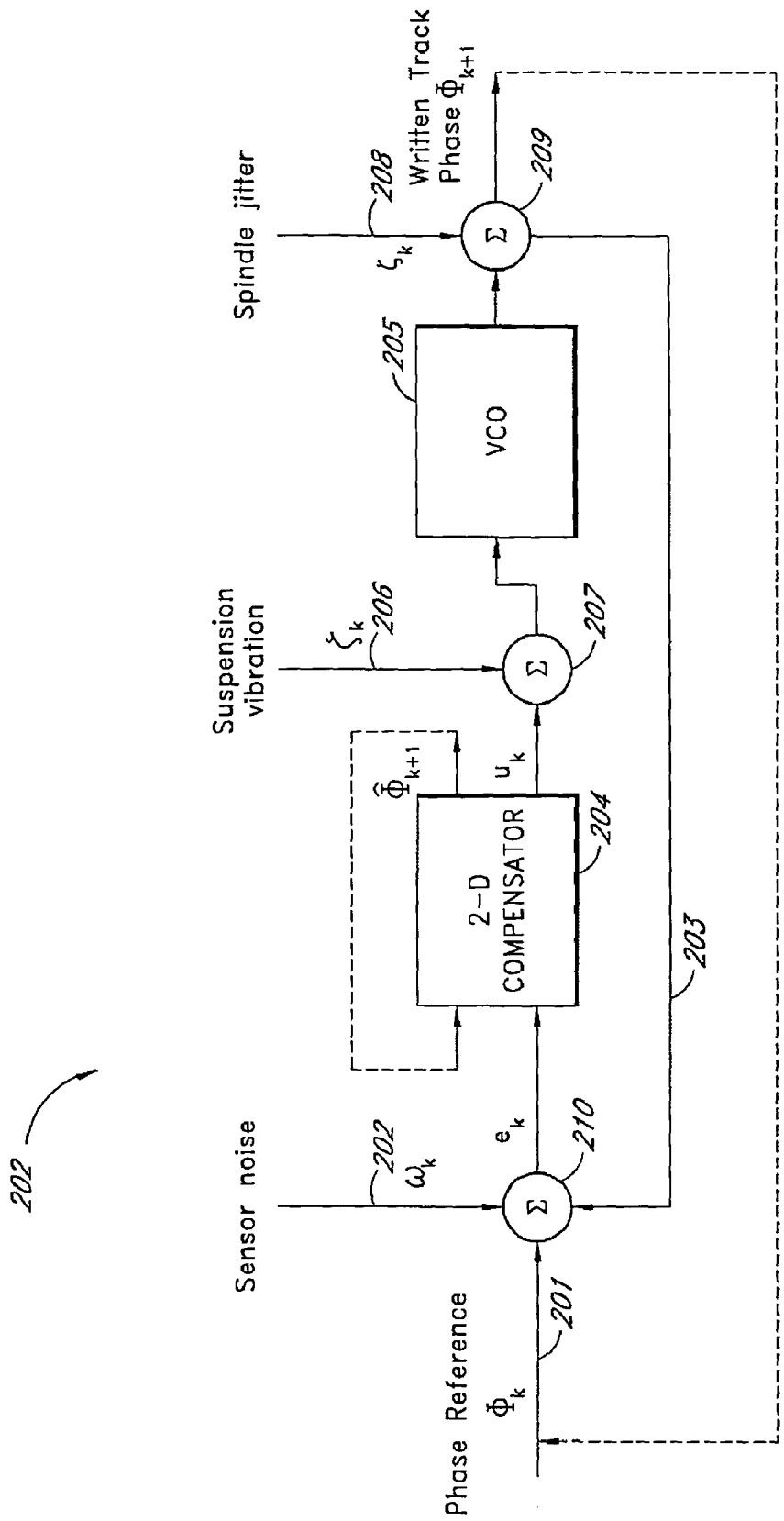
FIG. 2 is a block diagram of a phase servo loop with a two-dimensional compensator for use in connection with the self-servowriting system of FIG. 1.

FIG. 2 is a block diagram of a phase servo loop 200 with a two-dimensional compensator 204 for use in connection with the self-servowriting system 100. In the servo loop 200, a phase reference $\Phi_k$ is provided to a first input of an adder 210. System disturbances, such as sensor noise $\omega_k$ from sensors, such as, for example, the read sensor 142 are provided to a second input of the adder 210. A phase error output $e_k$ from the adder 210 is provided to a phase error input of the compensator 204. Input timing state variables $\hat{\Phi}_k$ are provided to a timing state variable input of the compensator 204. Output timing state variables $\hat{\Phi}_{k+1}$ are provided as an output of the compensator to be used as input timing state variables for writing a subsequent servo track. An oscillator control output $u_k$ from the compensator 204 is provided to a first input of an adder 207, and a system disturbance $\zeta_k$, such as, for example, suspension vibration, is provided to a second input of the adder 207.

An output of the adder 207 is provided as a control signal to a controlled oscillator 205. The controlled oscillator 205 can be a voltage controlled oscillator, phase controlled oscillator, current controlled oscillator, numerically controlled oscillator, etc. The controlled oscillator 205 provides phase and timing signals for the system 100. A phase output from the controlled oscillator 205 is provided to an input of an adder 209, and a system disturbance $\zeta_k$, such as, for example, spindle jitter, is provided to a second input of the adder 209. An output $\Phi_{k+1}$ from the adder 209 is provided as a feedback signal to a third input of the adder 210.

Timing deviations occur in the self-written servo tracks. These deviations can occur due to sensor noise, suspension vibrations, spindle jitter, and other disturbances. In some circumstances, these timing errors accumulate as more servo tracks are written and eventually the accumulated error can exceed allowed design limits of the system. The compensator 204 minimizes or reduces the accumulation of timing errors and thus improves the accuracy of the servo tracks.

In the closed phase servo loop 200, the compensator 204 is a controller and the controlled oscillator 205 is a controlled plant. The state space model for the plant is given by $$x_k^g(t+1) = A_g x_k^g(t) + B_g \{u_k(t) + \zeta_k(t)\} \quad (0.1)$$

$$\Phi_{k+1}(t) = C_g x_k^g(t) + \varsigma_k(t)$$

with $\zeta_k(t)$ being the output disturbance (spindle jitter) and $\zeta_k(t)$ being the suspension vibration disturbance. The measured output (i.e., the phase error) is given by $$e_k(t) = [-C_g \ 1]\begin{bmatrix} x_k^g \\ \Phi_k \end{bmatrix} + [-1 \ 1]\begin{bmatrix} \varsigma_k \\ \omega_k \end{bmatrix} \quad (0.2)$$

with $\omega_k$ being the sensor noise.

The general form of a two-dimensional compensator 204 is given by $$\begin{bmatrix} \hat{x}_k(t+1) \\ \hat{\Phi}_{k+1}(t) \end{bmatrix} = A_d \begin{bmatrix} \hat{x}_k(t) \\ \hat{\Phi}_k(t) \end{bmatrix} + B_d e_k \quad (0.3)$$

$$u_k(t) = C_d \begin{bmatrix} \hat{x}_k(t) \\ \hat{\Phi}_k(t) \end{bmatrix} + D_d e_k$$

where $A_d$, $B_d$, $C_d$, $D_d$ are matrices of appropriate dimensions.

In one embodiment, a two-dimensional observer-based controller for this system is given by $$\begin{bmatrix} \hat{x}_k(t+1) \\ \hat{\Phi}_{k+1}(t) \end{bmatrix} = \begin{bmatrix} A_g & 0 \\ C_g & 0 \end{bmatrix} \begin{bmatrix} \hat{x}_k(t) \\ \hat{\Phi}_k(t) \end{bmatrix} + \begin{bmatrix} B_g \\ 0 \end{bmatrix} u_k(t) + K_e(e_k(t) - \hat{e}_k(t)) \quad (0.4)$$

$$\hat{e}_k(t) = [-C_g \ 1]\begin{bmatrix} \hat{x}_k(t) \\ \hat{\Phi}_k(t) \end{bmatrix}$$

with $$u_k(t) = K_c \begin{bmatrix} \hat{x}_k(t) \\ \hat{\Phi}_k(t) \end{bmatrix} \quad (0.5)$$

Let $$K_e = \begin{bmatrix} K_e^1 \\ K_e^2 \end{bmatrix}; \quad K_c = [K_c^1 \quad K_c^2] \quad (0.6)$$

Substituting for $\hat{e}_k(t)$ and $u_k(t)$ gives the observer-based controller in output feedback form:

$$\begin{bmatrix} \hat{x}_k(t+1) \\ \hat{\Phi}_{k+1}(t) \end{bmatrix} = \begin{bmatrix} A_g & 0 \\ C_g & 0 \end{bmatrix} \begin{bmatrix} \hat{x}_k(t) \\ \hat{\Phi}_k(t) \end{bmatrix} + \begin{bmatrix} B_g \\ 0 \end{bmatrix} [K_c^1 \quad K_c^2] \begin{bmatrix} \hat{x}_k(t) \\ \hat{\Phi}_k(t) \end{bmatrix} + K_e e_k(t) - \quad (0.7)$$

$$\begin{bmatrix} K_e^1 \\ K_e^2 \end{bmatrix} [-C_g \quad 1] \begin{bmatrix} \hat{x}_k(t) \\ \hat{\Phi}_k(t) \end{bmatrix}$$

$$= \begin{bmatrix} A_g + B_g K_c^1 + K_e^1 C_g & B_g K_c^2 - K_e^1 \\ C_g + K_e^2 C_g & -K_e^2 \end{bmatrix} \begin{bmatrix} \hat{x}_k(t) \\ \hat{\Phi}_k(t) \end{bmatrix} + K_e e_k(t)$$

$$u_k(t) = [K_c^1 \quad K_c^2] \begin{bmatrix} \hat{x}_k(t) \\ \hat{\Phi}_k(t) \end{bmatrix}$$

The closed-loop system is formed by grouping the "x" and "Φ" states of the plant and controller together. Denoting $$\overline{x}_k = \begin{bmatrix} x_k^g \\ \hat{x}_k \end{bmatrix}, \quad \overline{\Phi}_k = \begin{bmatrix} \Phi_k \\ \hat{\Phi}_k \end{bmatrix} \quad (0.8)$$

the closed loop system is given by:

$$\begin{bmatrix} \overline{x}_k(t+1) \\ \overline{\Phi}_{k+1}(t) \end{bmatrix} = \overline{A} \begin{bmatrix} \overline{x}_k(t) \\ \overline{\Phi}_k(t) \end{bmatrix} + \overline{B} w_k(t) \quad (0.9)$$

where $$\overline{A} = \begin{bmatrix} A_g & B_g K_c^1 & 0 & B_g K_c^2 \\ -K_e^1 C_g & A_g + B_g K_c^1 + K_e^1 C_g & K_e^1 & B_g K_c^2 - K_e^1 \\ C_g & 0 & 0 & 0 \\ -K_e^2 C_g & C_g + K_e^2 C_g & K_e^2 & -K_e^2 \end{bmatrix} \quad (0.10)$$

and $$w_k(t) = \begin{bmatrix} \varsigma_k(t) \\ \zeta_k(t) \\ \omega_k(t) \end{bmatrix} \quad (0.11)$$

The above matrix can be partitioned into 4 block matrices given by:

$$\overline{A}_{11} = \begin{bmatrix} A_g & B_g K_c^1 \\ -K_e^1 C_g & A_g + B_g K_c^1 + K_e^1 C_g \end{bmatrix} \quad (0.12)$$

-continued $$\overline{A}_{12} = \begin{bmatrix} 0 & B_g K_c^2 \\ K_e^1 & B_g K_c^2 - K_e^1 \end{bmatrix}$$

$$\overline{A}_{21} = \begin{bmatrix} C_g & 0 \\ -K_e^2 C_g & C_g + K_e^2 C_g \end{bmatrix}$$

$$\overline{A}_{22} = \begin{bmatrix} 0 & 0 \\ K_e^2 & -K_e^2 \end{bmatrix}$$

The necessary and sufficient conditions for asymptotic stability are that $\overline{A}_{11}$ and $\overline{A}_{22}$ are stable. Since the eigenvalues of $\overline{A}_{11}$ are simply the poles of the observer and controller (which can be shown by elementary transformations), they are chosen to be stable by design. Stability of $\overline{A}_{22}$ requires $|K_e^2|<1$. These conditions reduce or prevent timing error propagation.

In one embodiment, the read head follows between first and second tracks while the write head is writing servo track information along a third track and some of the state variable information used for the writing process is a combination of stored state variable information obtained while writing the first and second tracks, in a manner similar to that described, for example, in U.S. patent application Ser. No. 10/280,603, filed Oct. 24, 2002, the entire contents of which is hereby incorporated by reference. In one embodiment, timing state variable information provided to the compensator 204 for writing the third track is a combination of first timing state variable outputs $\hat{\Phi}_{k+1}$ from the compensator produced while writing the first track and second timing state variable outputs $\hat{\Phi}_{k+1}$ from the compensator produced while writing the second track. In one embodiment, the first timing state variable outputs and the second timing state variable outputs are combined to produce timing state variable inputs for the compensator. In one embodiment, the combination of first timing state variable outputs and the second timing state variable outputs is based on a linear combination.

Figure 3:
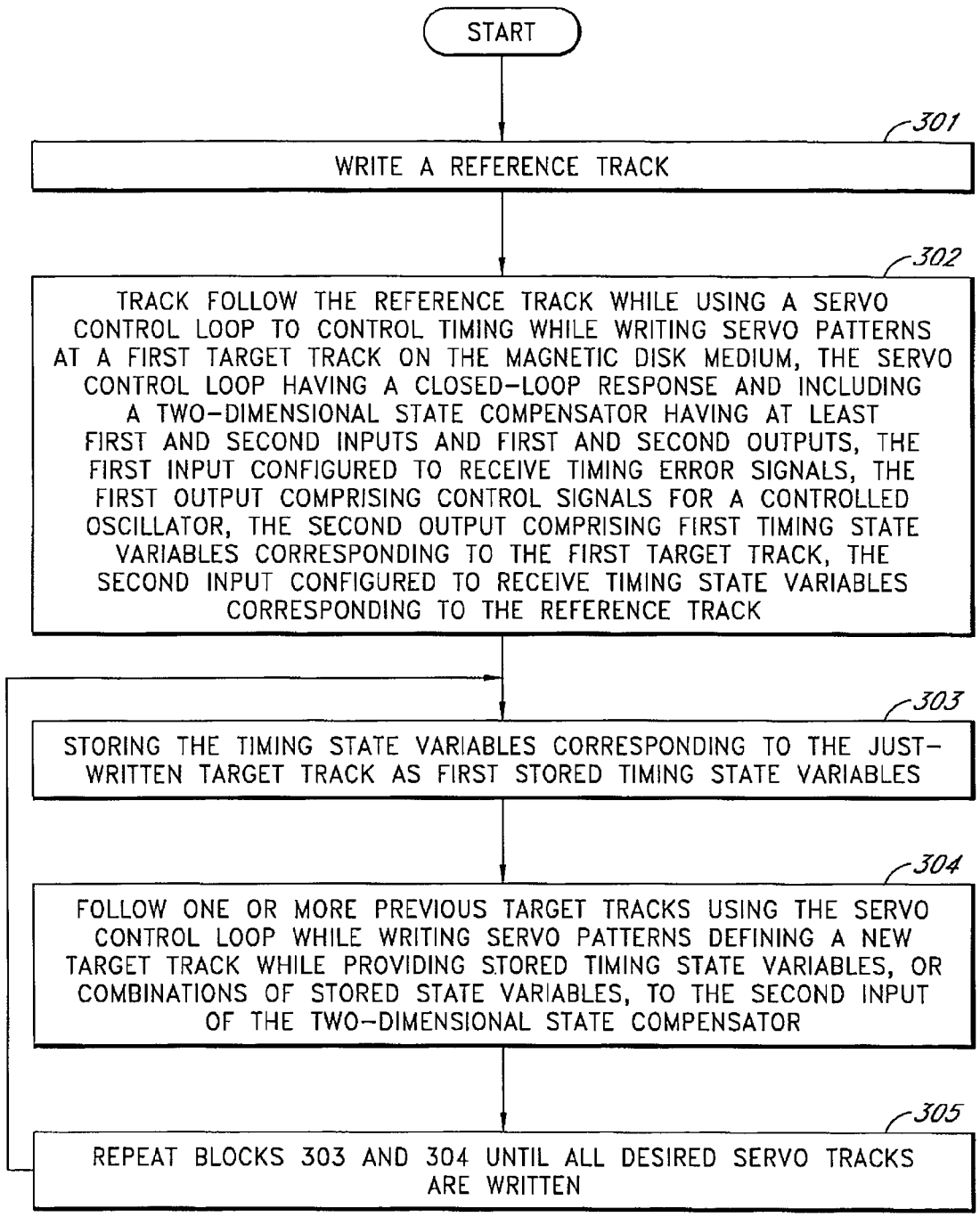
FIG. 3 is a flow chart showing the process of self-servowriting on the rotating magnetic disk medium of the disk drive shown in FIG. 1 using the phase servo loop shown in FIG. 2.

FIG. 3 is a flow chart 300 showing the process of self-servowriting servo tracks on the rotating magnetic disk medium of the disk drive shown in FIG. 1 using the phase servo loop shown in FIG. 2. In a first block 301, a reference track is written. In a subsequent block 302, the system follows the reference track while using a servo control loop to control timing while writing servo patterns at a first target track on the magnetic disk medium. The closed-loop servo control loop is shown in FIG. 2 and uses a two-dimensional state compensator to control a controlled oscillator. In a block 303, state variables are stored. In a block 304, the system follows one or more previous target tracks using the servo control loop while writing servo patterns defining a new target track while providing stored timing state variables, or combinations of stored state variables, to the second input of the two-dimensional state compensator. Blocks 303 and 304 are repeated until all desired servo tracks are written.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A method for writing servo tracks on a rotating magnetic disk medium, comprising:

following a reference track comprising previously-written servo patterns;

using a servo control loop while writing servo patterns at a first target track on the magnetic disk medium, the servo control loop having a closed-loop response and including a two-dimensional state compensator comprising at least first and second inputs and first and second outputs, said first input configured to receive timing error signals, said first output comprising control signals for a controlled oscillator, said second output comprising first timing state variables corresponding to said first target track, said second input configured to receive timing state variables corresponding to said reference track;

storing said timing state variables corresponding to said first target track as first stored timing state variables; and following said first target track using the servo control loop while writing servo patterns defining a second target track while providing said first stored timing state variables to said second input of said two-dimensional state compensator.

2. A method for writing servo tracks on a rotating magnetic disk medium, comprising:

writing a reference track comprising servo patterns;

track-following said reference track while writing a first self-written servo track under control of a closed-loop timing servo control loop having a compensator comprising at least first and second inputs and first and second outputs, said first input configured to receive timing error signals, said first output comprising control signals for a controlled oscillator, said second output comprising first timing state variables corresponding to said first self-written servo track, said second input configured to receive timing state variables corresponding to said reference track;

storing said first timing state variables; and track-following said first self-written servo track while writing a second self-written servo track and while providing said first stored timing state variables to said second input.

3. The method of claim 2, wherein said control signals for a controlled oscillator comprise control signals for a voltage-controlled oscillator.

4. The method of claim 2, wherein said control signals for a controlled oscillator comprise control signals for a numerically-controlled oscillator.

5. The method of claim 2, wherein said compensator comprises an observer-based compensator.

6. An apparatus for writing servo tracks on a rotating magnetic disk medium, comprising:

a rotating magnetic disk medium having a first servo track;

a memory for storing timing state information; and a timing control system module configured to control timing while self-writing a second servo track, said control system module comprising a compensator module, said compensator module comprising:

a first input configured to receive timing error signals;

a first output to provide control signals to a controlled oscillator;

a second input configured to receive previously-stored timing state variables corresponding to said first servo track; and a second output configured to provide timing state variables corresponding to said second servo track to said memory.

7. The apparatus of claim 6, wherein said control signals for a controlled oscillator comprise control signals for a voltage-controlled oscillator.

8. The apparatus of claim 6, wherein said control signals for a controlled oscillator comprise control signals for a numerically-controlled oscillator.

9. The apparatus of claim 6, wherein said control signals for a controlled oscillator comprise control signals for a current-controlled oscillator.

10. The apparatus of claim 6, wherein said control signals for a controlled oscillator comprise control signals for a phase-controlled oscillator.

11. The apparatus of claim 6, wherein said second servo track comprises servo burst patterns.

12. The apparatus of claim 6, wherein said second servo track comprises spiral servo patterns.

13. The apparatus of claim 6, wherein said second servo track comprises repetitive patterns whose amplitude varies with position.

14. The apparatus of claim 6, wherein said second servo track comprises repetitive patterns whose phase varies with position.

15. An apparatus for writing servo tracks on a rotating magnetic disk medium, comprising:

means for track-following said reference track while writing a self-written servo track under control of a closed-loop timing servo control loop having a compensator comprising at least first and second inputs and first and second outputs, said first input configured to receive timing error signals, said first output comprising control signals for a controlled oscillator, said second output comprising first timing state variables corresponding to said self-written servo track, said second input configured to receive timing state variables corresponding to a reference track; and means for storing said first timing state variables.

16. A method for writing servo tracks on a rotating magnetic disk medium, comprising:

writing a first servo track;

writing a second servo track; and track-following between said first and second servo tracks while writing a third servo track under control of a closed-loop timing servo control loop having a compensator comprising at least first and second inputs and first and second outputs, said first input configured to receive timing error signals, said first output comprising control signals for a controlled oscillator, said second output comprising output timing state variables corresponding to said third servo track, said second input configured to receive timing state variables corresponding to a combination of stored output timing state variables corresponding to said first servo track and said second servo track.

17. The method of claim 16, wherein said combination comprises a linear combination.

18. The apparatus of claim 16, wherein said control signals for a controlled oscillator comprise at least one of control signals for a voltage-controlled oscillator, control signals for a numerically-controlled oscillator, control signals for a current-controlled oscillator, and control signals for a phase-controlled oscillator.

19. The apparatus of claim 16, wherein said second servo track comprises servo burst patterns.

20. The apparatus of claim 16, wherein said second servo track comprises spiral servo patterns.

21. The apparatus of claim 16, wherein said second servo track comprises repetitive patterns whose amplitude varies with position.

22. The apparatus of claim 16, wherein said second servo track comprises repetitive patterns whose phase varies with position.

* * * * *